United States Patent [19]
Lee et al.

[11] Patent Number: 5,281,305
[45] Date of Patent: Jan. 25, 1994

[54] METHOD FOR THE PRODUCTION OF OPTICAL WAVEGUIDES EMPLOYING TRENCH AND FILL TECHNIQUES

[75] Inventors: Sae H. Lee, Fullerton; Richard L. Davis, Redondo Beach, both of Calif.

[73] Assignee: Northrop Corporation, Los Angeles, Calif.

[21] Appl. No.: 888,568

[22] Filed: May 22, 1992

[51] Int. Cl.$^5$ .................. H01L 21/306; B44C 1/22
[52] U.S. Cl. .................. 156/657; 156/659.1; 156/663
[58] Field of Search .................. 156/657, 663, 659.1

[56] References Cited

U.S. PATENT DOCUMENTS

| | | | |
|---|---|---|---|
| 3,865,646 | 2/1975 | Logan et al. | 148/171 |
| 4,070,516 | 1/1978 | Kaiser | 428/137 |
| 4,702,795 | 10/1987 | Douglas | 156/657 |
| 4,715,672 | 12/1987 | Duguay et al. | 350/96 |
| 4,929,302 | 5/1990 | Valette | 156/657 |
| 4,931,077 | 6/1990 | Angenent et al. | 156/663 |
| 4,933,262 | 6/1990 | Beguin | 430/320 |
| 4,973,119 | 11/1990 | Taki | 350/96 |
| 5,013,129 | 5/1991 | Harada et al. | 350/96 |
| 5,018,809 | 5/1991 | Shin et al. | 350/96 |
| 5,026,135 | 6/1991 | Booth | 350/96 |
| 5,030,316 | 7/1991 | Motoyama et al. | 156/657 |
| 5,118,384 | 6/1992 | Harmon et al. | 156/657 |

*Primary Examiner*—Carl F. Dees
*Attorney, Agent, or Firm*—Terry J. Anderson; Robert B. Block; Karl J. Hoch, Jr.

[57] ABSTRACT

A method is described for producing stacked optical waveguides in a silicon dioxide substrate and includes the steps of: etching a first trench in the substrate; filling the first trench with a glassy optical transmission media; depositing a layer of silicon dioxide over the filled trench; etching a second trench in the silicon dioxide layer, the second trench aligned with the first trench; and filling the second trench with a glassy optical transmission media.

9 Claims, 3 Drawing Sheets

METHOD FOR THE PRODUCTION OF OPTICAL WAVEGUIDES EMPLOYING TRENCH AND FILL TECHNIQUES

FIELD OF THE INVENTION

This invention relates to optical waveguides and, more particularly, to a method for producing stacked, parallel, optical waveguides using trench and fill techniques.

BACKGROUND OF THE INVENTION

Many integrated optical devices specify a precisely controlled separation between parallel waveguides. The required separation may be in the neighborhood of a few tenths of a micron, with the separation required to be constant over a distance of several centimeters. Conventional fabrication techniques which orient waveguides in a side-by-side arrangement on the surface of a substrate do not lend themselves to the achievement of the required accuracy and consistency. This is especially the case when waveguides are made from reflowed glasses.

It is known that certain acousto-optic interactions exhibit increased efficiency if the optical waveguides are arranged vertically (i.e. "stacked") as opposed to a side-by-side arrangement. However, in order to achieve such increased efficiency, a multiple-channel, stacked, optical waveguide structure must have planar surfaces to enable proper channel-to-channel interaction. Thus, it is necessary to maintain a planar surface after each fabrication step.

The prior art teaches a variety of techniques for the fabrication of optical waveguides. In U.S. Pat. No. 3,865,646 to Logan et al., a single or double heterostructure is fabricated from gallium arsenide-aluminum gallium arsenide layers. Liquid phase or molecular beam epitaxy are employed, to superimpose layers, one on the other. Two alternative techniques are employed to construct a waveguide layer. In one, an aluminum gallium arsenide layer is epitaxially grown over a mesa to form a two dimensional waveguide. In the second, edges of an active region of an aluminum gallium arsenide double heterostructure are differentially to provide a defined waveguide.

U.S. Pat. No. 4,070,516 to Kaiser describes a ceramic module body with incorporated glass channels that enable communication with a semiconductor chip mounted on the body. The process employs ceramic green sheets with incorporated glass paste channels.

U.S. Pat. No. 4,715,672 to Duguay et al. describes a planar silicon dioxide waveguide that is bounded by thin polysilicon, high index layers to provide anti-resonant reflecting surfaces.

U.S. Pat. No. 4,929,302 to Valette describes a procedure for producing optical waveguides wherein an additive process produces juxtaposed optical waveguides. A pair of guide structures are separated by a layer whose refractive index is intermediate the two optical waveguides. U.S. Pat. No. 4,933,262 to Beguin describes a method and structure for interconnecting an optical fiber with a planar optical guide.

In U.S. Pat. No. 4,973,119 to Taki, an optical isolator is described that employs a planar waveguide and a magnetic thin film having a magneto-optic effect. The substrate has a refractive index close to the refractive index of the magnetic thin film and the film is magnetized in a direction lying in a plane substantially normal to the direction in which light is propagated through the waveguide.

U.S. Pat. No. 5,013,129 to Harada et al describes an optical frequency converter wherein an embedded waveguide is surrounding by a cladding which fully reflects the fundamental optical frequency being transmitted, but not its harmonics. U.S. Pat. No. 5,018,809 to Shin et al., describes a planar optical waveguide with a self aligning cladding.

U.S. Pat. No. 5,026,135 to Booth describes a method for producing planar optical waveguides with a glassy coating of doped silicon dioxide that provides a low oxygen transmission value —to prevent waveguide deterioration.

Accordingly, it is an object of this invention to provide an improved method for producing stacked optical waveguides.

It is another object of this invention to provide a method for producing vertically stacked optical waveguides which lends itself to the use of differing optical waveguide materials.

It is still another object of this invention to provide an improved method for producing stacked optical waveguides wherein a high degree of positional precision is obtained.

SUMMARY OF THE INVENTION

A method is described for producing stacked optical waveguides in a silicon dioxide substrate and includes the steps of: etching a first trench in the substrate; filling the first trench with a glassy optical transmission media; depositing a layer of silicon dioxide over the filled trench; etching a second trench in the silicon dioxide layer, the second trench aligned with the first trench; and filling the second trench with a glassy optical transmission media.

DETAILED DESCRIPTION OF THE INVENTION

As will be hereinafter apparent, the invention employs a trench-and-fill process to produce planarized, low loss, optical channel waveguides. Using this technique, vertically stacked optical waveguides are fabricated, with the technique allowing highly precise positioning therebetween. The procedure employs reactive-ion etching, chemical wet etching and reflow of deposited glasses, all of which enable precise control of the shape and size of waveguide cross sections. The procedure produces smooth waveguide surfaces that enable the production of ultra-low loss optical waveguides. During the following description, certain waveguide materials will be described as exemplary, e.g., Corning 7059 glass (a trademark of the Corning Company,) Borosilicate glass (BSG), phosphosilicate glass (PSG) and silicon dioxide. Each of these glasses (except 7059 glass) is deposited using a low-pressure chemical vapor deposition (LPCVD) system. The Corning 7059 glass is preferably deposited by an RF sputter process. Clearly, other waveguide materials can be utilized so long as they are subject to the processing procedures to be described hereafter. The substrate on which the to-be-described waveguide structure is constructed is preferably a thermally oxidized silicon wafer on which a 7-10 micron thick silicon dioxide layer is present.

Figure 1:
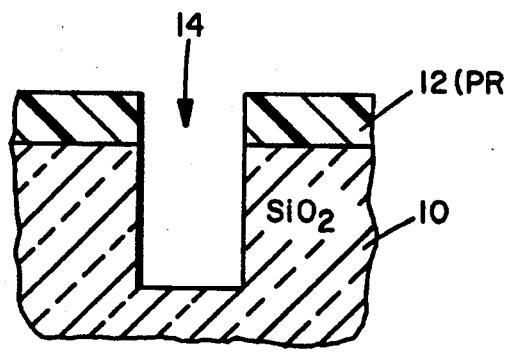
FIGS. 1-13 illustrate the sequential steps of the invention that enable the production of vertically stacked, positionally precise, optical waveguides.

Referring now to FIG. 1, a silicon dioxide, thermal oxidation layer 10 has a photoresist 12 deposited on its surface. Photoresist 12 is photolithographically defined to create a trench opening 14. (The supporting silicon substrate for silicon dioxide layer 10 is not shown. Subsequently, trench opening 14 is etched into silicon dioxide layer 10 using a reactive ion etch procedure.

Figure 2:
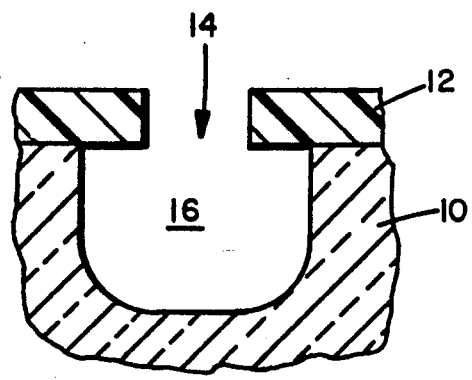
Figure 3:
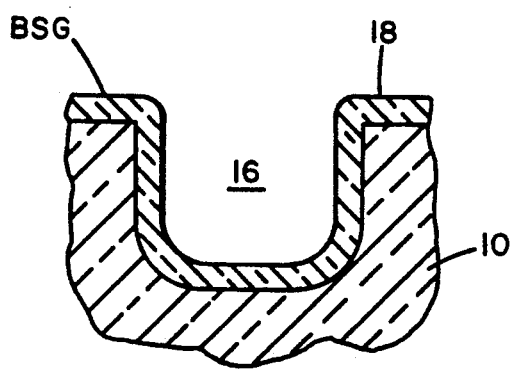

In FIG. 2, trench 14 is further etched by a wet-etch process to create an enlarged trench area 16. The wet-etch procedure enables the bottom corners of enlarged trench 16 to be rounded and for the bounding surface of trench 16 to be smoothed. In FIG. 3, photoresist 12 has been stripped and a thin layer of borosilicate glass 18 deposited over the surface of silicon dioxide layer 10 and trench 16. Subsequently the wafer is subjected to a reheating step whereby borosilicate glass layer 18 reflows. This process enables the further smoothing of the etched surfaces of trench 16.

Figure 4:
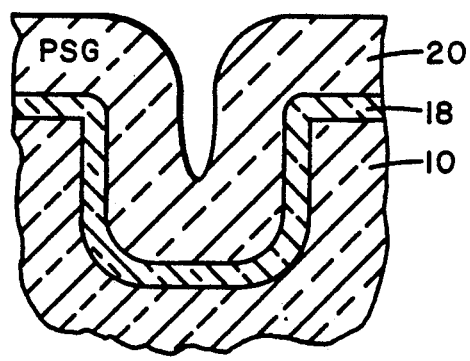

In FIG. 4, a layer of phosphosilicate glass 20 is deposited in trench 16 and over the surface borosilicate glass layer 18. The deposition of the phosphosilicate glass layer 20 is preferably carried out using a low-pressure, chemical vapor deposition procedure.

Figure 5:
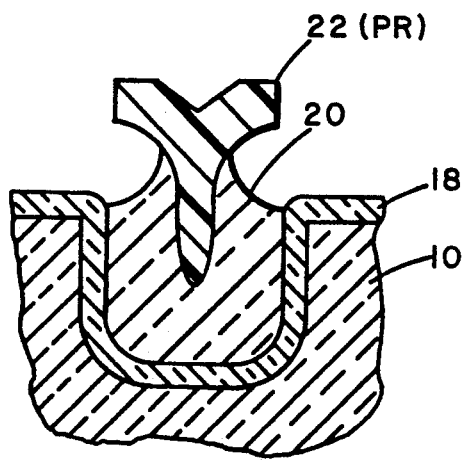

Next, (see FIG. 5) the entire wafer surface is coated with a photoresist 22, which photoresist is then patterned so that it extends only over the extent of the trench area defined by borosilicate glass layer 18. After patterning, the underlying phosphosilicate glass layer 20 is wet etched so that it is somewhat undercut under the remaining photoresist layer 22.

Figure 6:
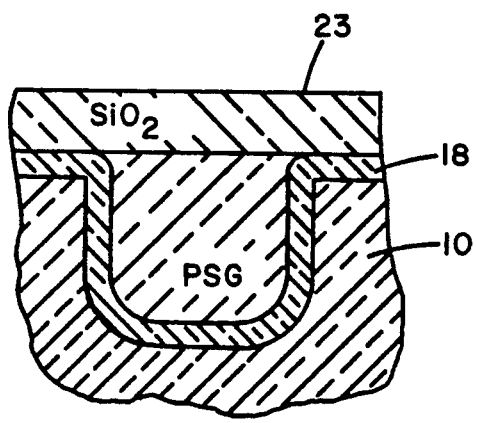

Photoresist layer 22 is now stripped (see FIG. 6) and the wafer subjected to a reheating step whereby phosphosilicate glass layer 20 reflows to fill in the vacant region where photoresist 22 had been removed. As a result, a flat upper surface 21 is produced upon which a layer of silicon dioxide 23 is then deposited using an LPCVD procedure.

Figure 7:
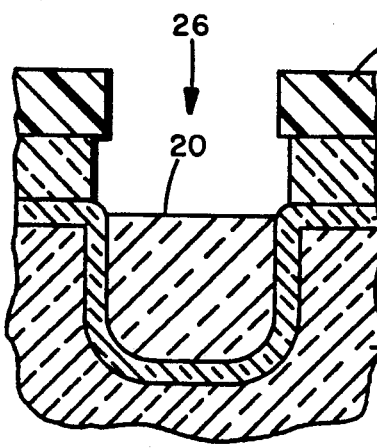

Next, as shown in FIG. 7, silicon dioxide layer 23 is coated with a layer of photoresist 24 which is patterned to define a second trench for a Corning 7059 glass optical waveguide. After patterning, silicon dioxide layer 23 is reactive ion etched to create opening 26. Then, the wafer is subjected to a wet-etch which mildly undercuts silicon dioxide layer 23 and acts to smooth the internal surfaces of trench 26.

Figure 8:
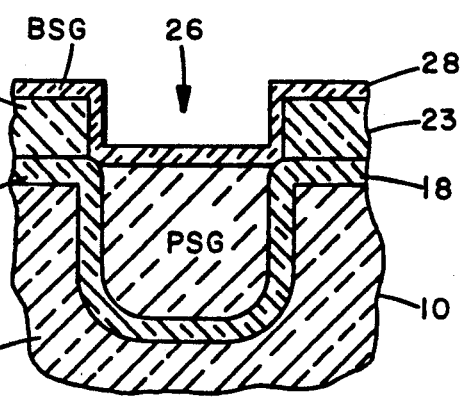
Figure 9:
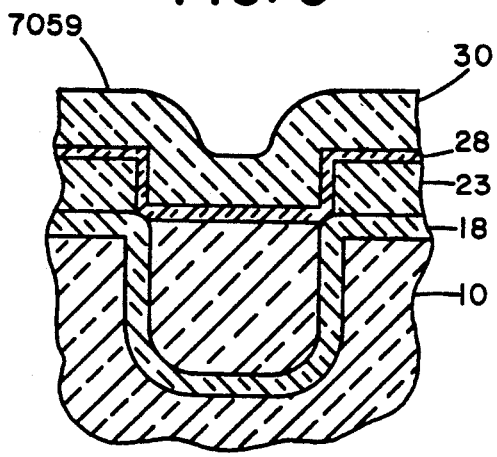
Figure 10:
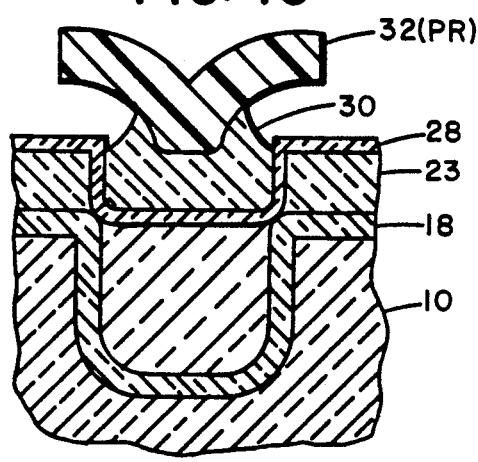

As shown in FIG. 8, photoresist layer 24 is now stripped and a thin layer of borosilicate glass 28 is deposited and reflowed to further smooth the surfaces of trench 26. Next (in FIG. 9), a layer 30 of 7059 glass is deposited and reflowed. The wafer is then coated (FIG. 10) with a layer of photoresist 32 which is patterned to cover the extent of the trench formed by borosilicate glass layer 28. The underlying 7059 glass layer 30 is wet etched to cause it to be undercut under the remaining portion of the photoresist layer 32.

Figure 11:
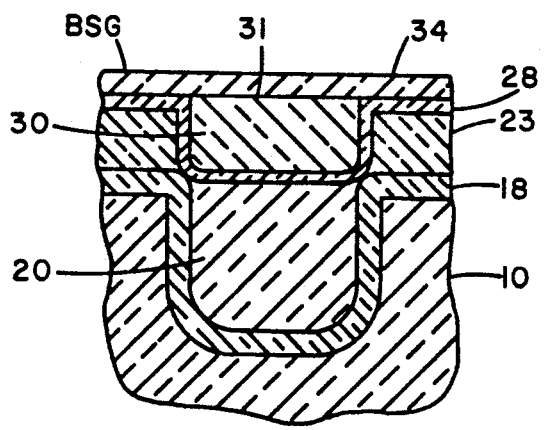
Figure 12:
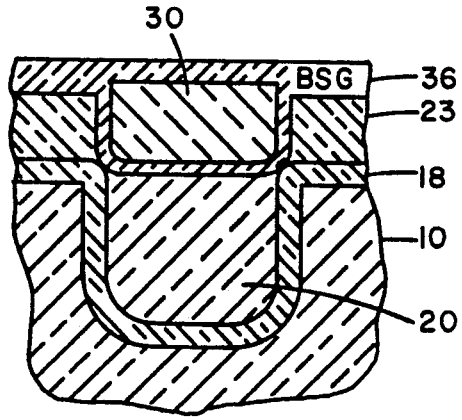
Figure 13:
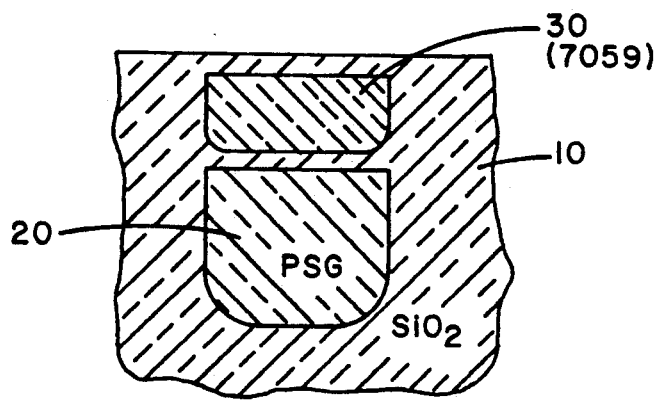

Photoresist layer 32 is then stripped and the wafer reflowed (FIG. 11) to create a planar upper surface 31 upon which a layer of borosilicate glass 34 is deposited using an LPCVD procedure. FIG. 12 is the same as FIG. 11 except that after the deposition of borosilicate glass layer 34 onto borosilicate layer 28, they merge into a single BSG layer 36. Since the refractive index of borosilicate glass and silicon dioxide are nearly equal, the structure can be represented (optically) as shown in FIG. 13. Waveguides 20 and 30, therefore, essentially reside in a single index medium with the medium acting as a cladding thereabout. Furthermore, since 7059 glass exhibits a higher refractive index than phosphosilicate glass, passive coupling therebetween does not occur under normal circumstances.

Figure 14:
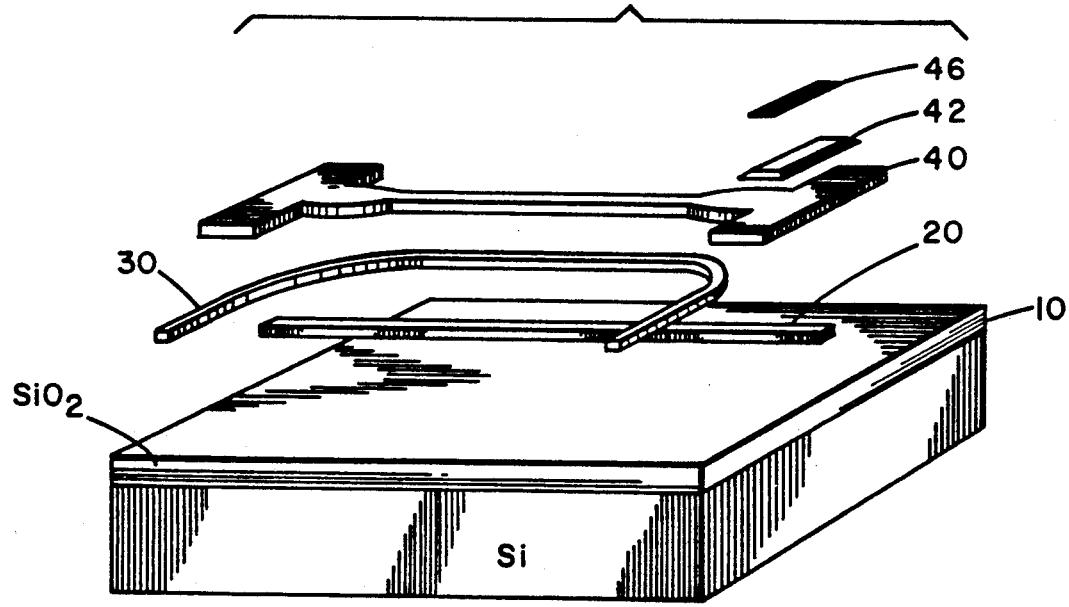
FIG. 14 is an exploded view of an acousto-optic tunable coupler that makes use of the invention.

Turning now to FIG. 14, an acousto-optic modulator structure is shown that employs the stacked waveguide structure produced by the steps shown in FIGS. 1-13. In FIG. 14, the structure has been exploded so as to show its various components. Silicon dioxide layer 10 has embedded therein stacked waveguides 20 and 30. A borosilicate glass acoustic waveguide layer 40 is superimposed over waveguides 20 and 30 and acts as a modulating element. Zinc oxide pad 42 is disposed on waveguide layer 40 and an interdigitated, conductive transducer 46 resides on zinc oxide pad 42. By applying an appropriate signal to transducer 46 a surface acoustic wave is induced in waveguide 40 which modulates the refractive indices of both waveguide 20 and 30. A grating is thus established which compensates for the mismatch in optical phase velocities within waveguides 20 and 30. As a result, coupling therebetween can be selectively achieved in accordance with a signal induced in waveguide 40.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for producing stacked optical waveguides in an optically transmissive material substrate, the method comprises the steps of:
   a) etching a first trench in the substrate;
   b) filling said first trench with a first optically transparent glass;
   c) depositing a layer of a second optically transparent glass over said filled first trench;
   d) etching a second trench in said layer of second optically transparent glass, said second trench aligned with said first trench; and
   e) filling said second trench with a third optically transparent glass.

2. The method as recited in claim 1 where, after the etches recited in steps a) and d), steps a) and d) further comprise the further substeps of:
   wet-etching the trench to smooth its surface; and
   depositing and reflowing a thin continuous glass layer on the surface of each trench as a support for said respective optically transparent glass.

3. The method as recited in claim 1, wherein steps b) and e) comprise the further steps of:
   masking the filled trench and removing non-masked glass on said substrate; and
   removing the mask and reflowing said optically transparent glass to provide a uniform interface surface therefore.

4. The method as recited in claim 3 wherein a separation between said first trench and said second trench is the thickness of said continuous glass layer.

5. The method as recited in claim 4 wherein said first optically transparent glass is silicon dioxide.

6. The method as recited in claim 5 wherein the optical index of said continuous glass layer is near that of silicon dioxide.

7. The method as recited in claim 6 wherein one of said glasses filling said first and second trenches is phosphosilicate glass.

8. The method as recited in claim 7 wherein one said glassy optical transmission media is a glass with refractive index greater than that of phosphosilicate glass.

9. The method as recited in claim 8 wherein said continuous glassy layer is borosilicate glass.

* * * * *